(12) United States Patent
Sasse et al.

(10) Patent No.: US 12,484,841 B2
(45) Date of Patent: Dec. 2, 2025

(54) SLEEP MONITORING

(71) Applicant: BIOANALYTICS HOLDINGS LIMITED, Melbourne (AU)

(72) Inventors: Anthony Sasse, Melbourne (AU); Cyril Jones, Melbourne (AU); Stephen Ratten, Melbourne (AU); Owen Morgan, Melbourne (AU)

(73) Assignee: BIOANALYTICS HOLDINGS LIMITED, Melbourne (AU)

( * ) Notice: Subject to any disclaimer, the term of this patent is extended or adjusted under 35 U.S.C. 154(b) by 368 days.

(21) Appl. No.: 16/754,394

(22) PCT Filed: Oct. 15, 2018

(86) PCT No.: PCT/AU2018/000197
§ 371 (c)(1),
(2) Date: Apr. 8, 2020

(87) PCT Pub. No.: WO2019/071291
PCT Pub. Date: Apr. 18, 2019

(65) Prior Publication Data
US 2021/0196187 A1 Jul. 1, 2021

(30) Foreign Application Priority Data
Oct. 13, 2017 (AU) .............................. 2017904161

(51) Int. Cl.
*A61B 5/00* (2006.01)
*A61B 5/145* (2006.01)

(52) U.S. Cl.
CPC .......... *A61B 5/4806* (2013.01); *A61B 5/0004* (2013.01); *A61B 5/002* (2013.01);
(Continued)

(58) Field of Classification Search
CPC ..... A61B 5/742; A61B 5/6832; A61B 5/6831; A61B 5/682; A61B 5/6819;
(Continued)

(56) References Cited

U.S. PATENT DOCUMENTS 9,202,008 B1 12/2015 Frederick et al.
10,028,698 B1 * 7/2018 Frederick ............. A61B 5/7282
(Continued)

FOREIGN PATENT DOCUMENTS

CN 101123927 A 2/2008
CN 105078426 A 11/2015
(Continued)

OTHER PUBLICATIONS

Sadoughi F et al., "Application of neural network and SVM to classify movement of rat in medical science," International Research Journal of Applied and Basic Sciences, vol. 4, No. 3, 2012, pp. 502-512, ISSN 2251-838X.
(Continued)

*Primary Examiner* — Amanda L Steinberg
(74) *Attorney, Agent, or Firm* — Bookoff McAndrews, PLLC

(57) ABSTRACT

A method of monitoring the status of a body of a person during sleep, said method comprising: —retaining in or adjacent the mouth or nose of said person an electronic detector which detects indications of the state of said body, —wirelessly transmitting a first data stream representing said indications to a data receiving means, —transmitting said first data stream from said data receiving means to a data processing means, —processing said first data stream within said data processing means to produce a second data stream representing said indications, or conclusion drawn from said indications, and —displaying a visual representation of said indications or conclusions.

18 Claims, 10 Drawing Sheets

(52) U.S. Cl.
CPC ........ *A61B 5/14542* (2013.01); *A61B 5/6819* (2013.01); *A61B 5/682* (2013.01); *A61B 5/6831* (2013.01); *A61B 5/6832* (2013.01); *A61B 5/742* (2013.01)

(58) Field of Classification Search
CPC ... A61B 5/14542; A61B 5/0004; A61B 5/002; A61B 5/389; A61B 5/369; A61B 5/4806
See application file for complete search history.

(56) References Cited

U.S. PATENT DOCUMENTS

| | | | |
|---|---|---|---|
| 2008/0035157 A1* | 2/2008 | Yan | A61F 5/566 128/845 |
| 2009/0301500 A1* | 12/2009 | Abramson | A61F 5/566 128/848 |
| 2011/0066059 A1 | 3/2011 | Lehrman et al. | |
| 2012/0123225 A1 | 5/2012 | Al-Tawil | |
| 2013/0023797 A1* | 1/2013 | Hanewinkel | A61B 5/1121 29/428 |
| 2013/0131464 A1 | 5/2013 | Westbrook et al. | |
| 2014/0114165 A1 | 4/2014 | Walker et al. | |
| 2015/0073232 A1 | 3/2015 | Ahmad et al. | |
| 2016/0022205 A1* | 1/2016 | Remmers | A61B 5/7264 600/301 |
| 2017/0020391 A1 | 1/2017 | Flitsch et al. | |
| 2017/0196727 A1* | 7/2017 | Giridharagopalan | A61B 5/0024 |
| 2017/0312117 A1* | 11/2017 | Shah | A61B 5/01 |
| 2017/0326320 A1* | 11/2017 | Baigent | A61M 16/0683 |

FOREIGN PATENT DOCUMENTS

| | | |
|---|---|---|
| CN | 105283219 A | 1/2016 |
| JP | 2010-082226 A | 4/2010 |
| JP | 2014-504517 A | 2/2014 |
| WO | 2007015833 A2 | 2/2007 |
| WO | WO 2015/187949 | 12/2015 |
| WO | 2017106840 A1 | 6/2017 |
| WO | WO 2017/218947 | 12/2017 |

OTHER PUBLICATIONS

Kitamura M et al., "Direct cardiac potential trigger for chronic control of a ventricular assist device," American Society for Artificial Internal Organs Journal, vol. 47, No. 3, 2001, pp. 302-304, doi: 10.1097/00002480-200105000-00028. PMID: 11374777.
Office Action in Japanese Application 2020-520062 dated Oct. 4, 2022, with English translation (12 pages).
Office Action in Chinese Application 2018800662728 dated Oct. 10, 2022, with English translation (18 pages).
European Search Opinion in EP 18865751.4 (7 pages).
European Search Report in EP 18865751.4, dated Jun. 21, 2021 (3 pages).
Office Action in Canadian Application No. 3,078,801, dated Oct. 25, 2024.

* cited by examiner

SLEEP MONITORING

TECHNICAL FIELD

This invention concerns a method and apparatus for use in monitoring the status of a person while they are asleep. In addition to its more general application, the invention is particularly adapted to use with an intraoral mandibular advancement device for treatment of obstructive sleep apnea.

BACKGROUND

There is a need for a low cost and convenient to use means by which the status of the body of a person can be monitored during sleep in order to record and/or provide an alert that a period of diminished breathing is underway.

Sleep apnea is a major concern for many people. The two major types of sleep apnea are Obstructive Sleep Apnea (OSA) and Central Sleep Apnea (CSA). In order to treat OSA, many different types of devices have been proposed, and are in use, for advancing the mandible of a person during sleep in order to provide a clearer airway. It has proven difficult to provide confirmation that such devices work and are efficacious in delivering the benefits claimed for them. An aim of the present invention is to provide means by which such confirmation may be achieved.

The principles of a particularly effective mandibular advancement device are described in international patent publication no. WO2006/072147. Some particularly preferred embodiments of the present invention preferably utilize a device of that general type.

However, the present invention may otherwise be used, by way of other embodiments, in testing for, and monitoring of CSA where, rather than obstruction of the airway, the issue is a diminished stability in the body's feedback mechanisms that control respiration.

The present invention may also be used for monitoring the status of a person who, while not suffering from sleep apnea, may benefit from their condition being monitored while unwell or following surgery.

SUMMARY OF INVENTION

Accordingly, in one aspect the invention provides a method of monitoring the status of a body of a person during sleep, said method comprising:
  retaining in or adjacent the mouth or nose of said person an electronic detector which detects indications of the state of said body,
  wirelessly transmitting a first data stream representing said indications to a data receiving means,
  transmitting said first data stream from said data receiving means to a data processing means,
  processing said first data stream within said data processing means to produce a second data stream representing said indications, or conclusion drawn from said indications, and
  displaying a visual representation of said indications or conclusions.

Preferably said second data stream is transmitted wirelessly from said data processing means to a remote location. Preferably said wireless transmission of said first data stream occurs while said person is asleep and said data receiving means is adjacent said person.

Preferably for said person a single smartphone comprises:
  said data receiving means,
  said data processing means, and
  a means by which said transmission of the second data stream is made to said remote location.

The visual representation of said indications or conclusions may be displayed on said smartphone.

The remote location may comprise a computer facility which analyses corresponding said second data streams received from multiple smartphones.

Said electronic detector may be retained in position by a device bearing on the teeth and/or gingiva of said person. Said electronic detector may be retained by or within an intraoral mandibular advancement device being worn by said person.

Alternatively, said electronic detector may be mounted in a housing which is retained in position by adhesion or adhesive tape onto the face of the person.

Alternatively, said electronic detector may be mounted in a housing which is retained in position by a strap extending around the head of the person.

In another aspect the invention provides a device for wearing by a person during sleep for the purpose of monitoring the status of said person's sleep, said device comprising:
  a first portion adapted to be retained within the person's mouth,
  a second portion adapted to detect, from outside said body, indications of the state of said body, and
  means for wirelessly transmitting a first data stream representing said detected indications to a data receiving means located adjacent said sleeping person.

Preferably said data processing means is a smartphone.

Preferably the device comprises an intraoral mandibular advancement device adapted to be worn by said person.

Preferably said second portion adapted to detect indications of the state of said body comprises an electronic detector of airflow, audio and acceleration. It may also be adapted to detect indications of one or more of electro-musculogram data, electro-osculogram data, electro-encephalogram data and percent of saturated oxygen.

Said wireless transmission means is preferably a Bluetooth transmitter.

In another aspect the invention provides apparatus for monitoring the status of a body of a person during sleep, said apparatus comprising:
  a device according to any one of claims 6 to 15, and
  a mobile smartphone including:
    said data receiving means,
    a data processing means for receiving said first data stream from said data receiving means, processing said first data stream to produce a second data stream representing said status, or an indication of said status, data, or conclusions drawn from said indications, and
    means for transmitting from said data processing means to a remote location said second data stream representing said indications and/or an interpretation of, or conclusion drawn from, said indications.

Preferably said data processing means comprises software loaded into said smartphone.

BRIEF DESCRIPTION OF DRAWINGS

In order that the invention may be more fully understood there will now be described, by way of example only, preferred embodiments and other elements of the invention with reference to the accompanying drawings where.

With respect to the different embodiments of the invention, features which have equivalent function in each embodiment are identified by numerals which are one hundred different from the numerals identifying equivalent features in another embodiment.

DESCRIPTION OF EMBODIMENTS

Figure 1:
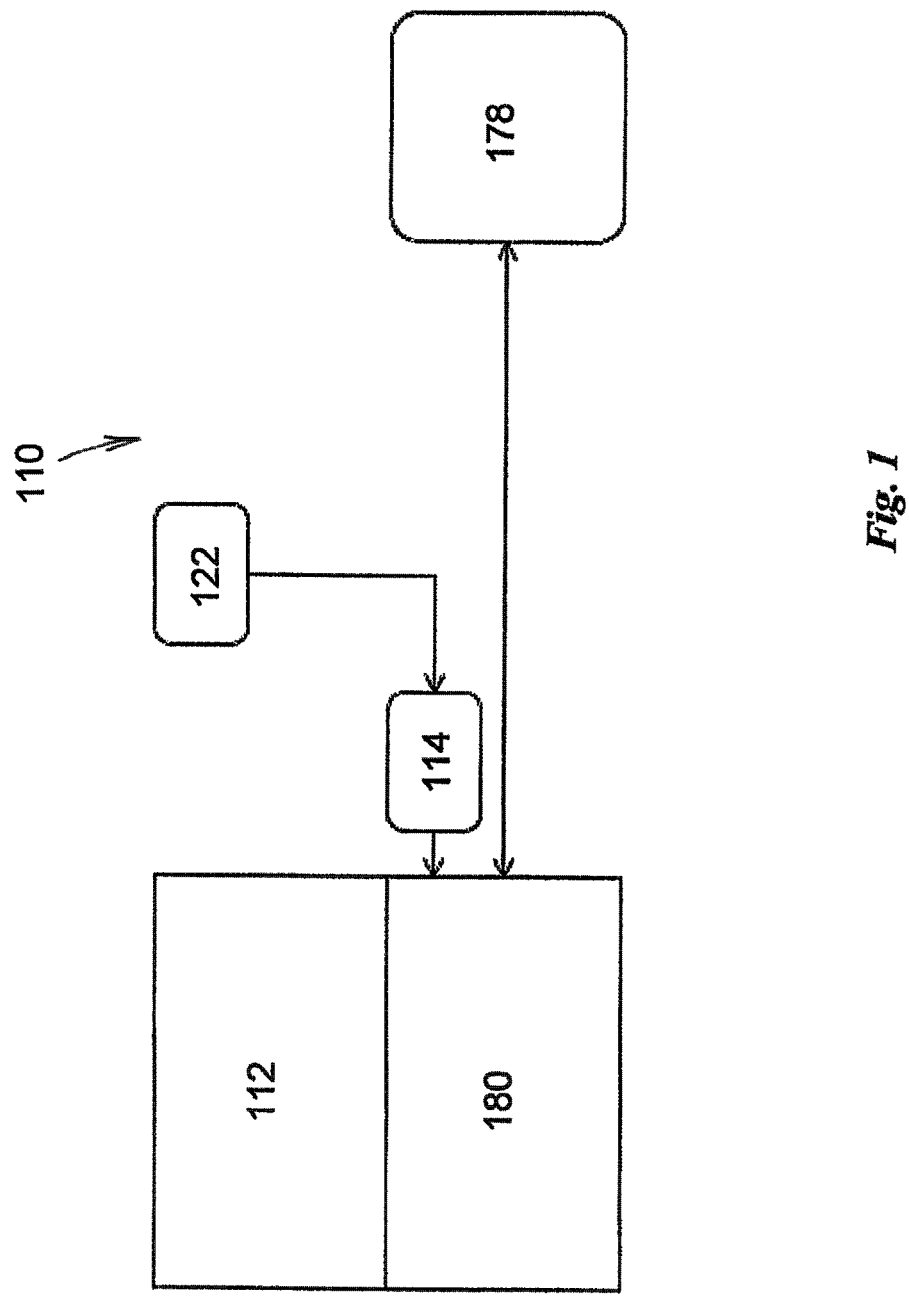
FIG. 1 is a schematic of an apparatus and system according to a first embodiment of the invention.

Referring to FIG. 1, the first embodiment of the invention utilizes apparatus 110 incorporating a mandibular advancement device 112 the same as the device 12 shown in FIGS. 4 to 7.

As shown in FIGS. 4 to 7, the mandibular advancement device 12 incorporates a curved anterior maxillary abutment portion 15 mounted to an intraoral body portion 65 via an extraoral member portion 18. An arm 20 on the extraoral member 18 engages into the intraoral body portion 65. The effective length of the arm 20 is manually adjustable by the action of an adjustment wheel 60 whose central bore 61 is threadedly engaged with a thread 62 on the arm 20. The effective height of the extraoral member 18 can be adjusted by the angularly adjustable extraoral adjustment means 55 which adjusts the angle subtended by the articulation in the middle of the extraoral member 18.

The generally banana-shaped anterior mandibular abutment 25 is connected to the body portion 65 by connecting members 30 and 31. The intraoral posterior maxillary abutments 40 and 41 are connected to the intraoral body portion 65 by respective arms 35 and 36. In use the abutment surfaces 40 and 41 make contact with portion of the maxillary surface and that contact resists rotation of the device induced by the forces applied to the mandibular abutment surface 25 and the anterior maxillary abutment surface 15.

The concave surface 16 of the anterior maxillary abutment 15 is an elastomeric material that is shaped to fit comfortably upon the soft tissue and skin covering the user's sub-nasal maxillary bone. The anterior mandibular abutment 25 has a convex anterior face 26 which in use pushes on the user's gingiva covering their mandible. This arrangement allows the orthotic device to be applied to patients who have lost one or more of their anterior mandibular teeth. By abutting the gingiva covering the mandible, the anterior mandibular abutment surface 26 avoids or minimizes any undesirable movement of mandibular teeth over time.

An electronic module 80, specifically a sleep data collection and analysis module (hereinafter referred to as an SDCA module) is embedded within (or alternatively may be clipped over) the convex anterior face 17 of the maxillary abutment 15 at a region directly below the user's nose. A rechargeable electric battery 84 is also embedded within the concave face of the maxillary abutment 15 in order to provide an electric power source for the SDCA module 80. The battery 84, and much of the module 80, lie within cavities beneath the surface of the face 17 so their positions are indicated as dashed outlines.

The module 80 includes an electronic chip or chips on a printed circuit board (hereinafter referred to collectively as an SDCA detector system) 82 which acts as an electronic detector of the desired conditions. The device 12 is worn by the user during periods of sleep in order that relevant data may be collected by the SDCA detector system. The SDCA detector system includes two nasal and one oral sensors. The SDCA detector system is positioned so its exposed sensors are contacted by air passing into and out of the user's nose and/or mouth. The SDCA detector system detects acceleration of the user's upper lip, ambient audio and airflow past the sensors, stores that information, and transmits the data to a smartphone placed adjacent the user by means of a Bluetooth LE data link in near real time. An app loaded by the user into the smartphone processes the data and displays the results on the phone's screen.

Referring to FIG. 1, concerning the first embodiment of the invention, when the user arises after sleep, they take off the mandibular advancement device 112 and place it on a base unit 114 which inductively charges the battery 84 after each night's sleep. The base unit 114 is powered from a USB charger 122. The base unit 114 is a docking station for the device 112 when the device 80 is not in use, and is configured to keep the device 112 clean and dust free. The base unit 114 has a region where relevant portions of the device 112 are soaked in an appropriate sterilizing fluid.

The user's smartphone 178 downloads the collected data from the SDCA module 80, which remains on the device 112. The SDCA module communicates with the smartphone 178 via a Bluetooth connection in order to upload the collected data from the SDCA module 80 while the user is wearing the device. The user's smartphone 178, placed near the sleeping user, is used to collect the data transmitted by the SDCA and to analyse the data to show the user the effectiveness of the device 112 for at least the previous sleep period or for other sleep periods as required. That analysis is performed by an app previously loaded by the user into the smartphone. The smartphone thus functions as a data processing means. There is accordingly a step of wirelessly transmitting a first data stream from the SDCA module 80 to a receiving means within the phone 178 after which, within the phone, the first data stream is transmitted to a data processing means where the data received is processed.

Figure 2:
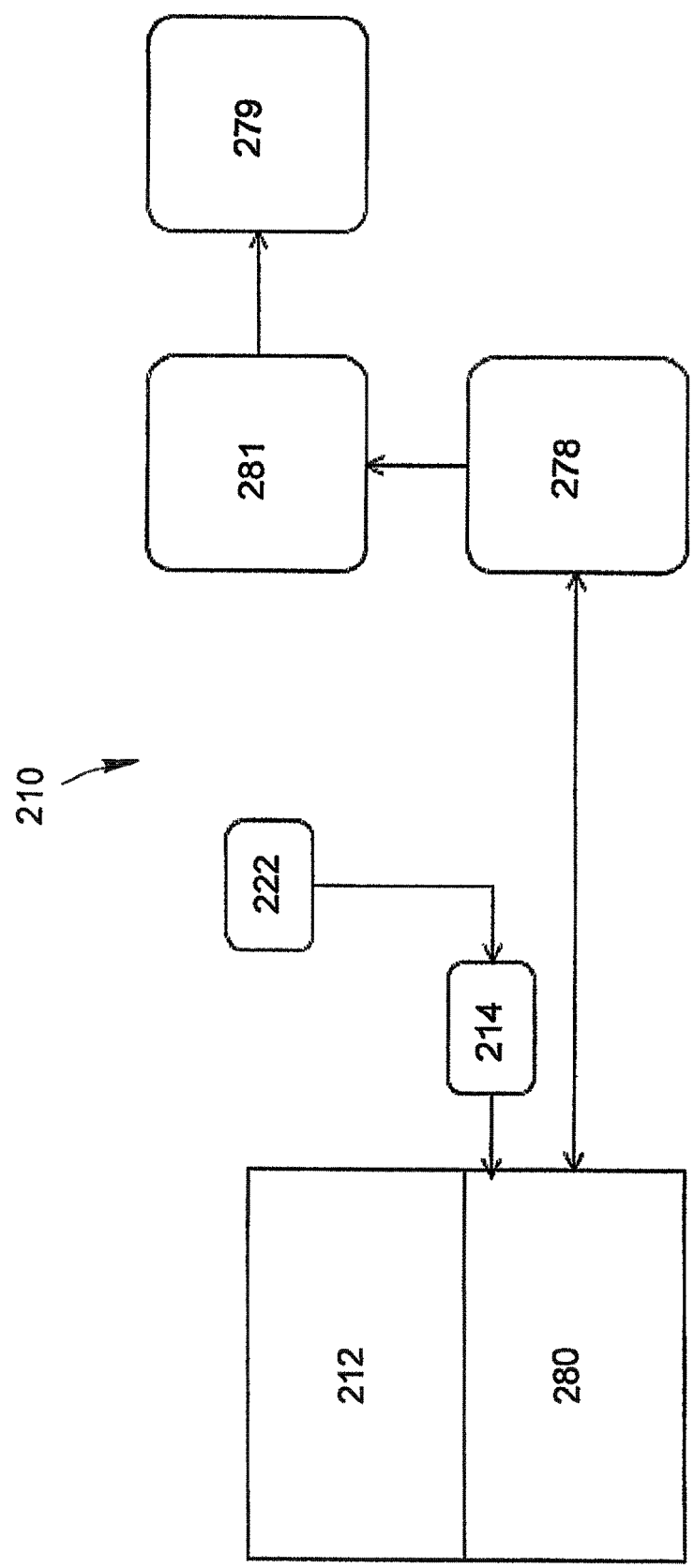
FIG. 2 is a schematic of an apparatus and system according to a second embodiment of the invention.

Referring to FIG. 2, the apparatus 210 for the second embodiment is mostly the same as that described above for the first embodiment. A first main difference is that the SDCA module 280 has additional detection and recording functions when compared with the SDCA module 180 in FIG. 1. The SDCA module 280 in FIG. 2 records electro-musculogram (EMG) data, electro-osculogram (EOG) data, electro-encephalogram (EEG) data and percent of saturated oxygen (SA02) data in addition to the basic standard measurements of airflow, audio and acceleration recorded by the module 180 used in the first embodiment.

The second main difference is that the the smartphone 278 can upload the data to a suitable external repository 279 via the internet 281. Optionally the external repository 279 includes a central data analysis server which collects the data uploaded from multiple devices for appropriate health monitoring.

The electronics used in the base unit 214 are the same as the electronics used in the base unit 114.

By providing users with devices with different SDCA options, using different anterior maxillary abutment pads for the different SDCA options, the mandibular advancement device can be easily manufactured in a variety of versions. Pads for anterior maxillary abutment portions 15 can be easily interchanged. Even after purchase, a user can upgrade the product they have by purchasing an alternative version of the pad and thus change the mandibular advancement device to an enhanced version.

The invention provides higher level functions to a conventional mandibular advancement device which enhances its value and utility, so making it more attractive to users. The invention also provides confirmation of the effectiveness of the mandibular advancement device in assisting sleep behavior.

Figure 3:
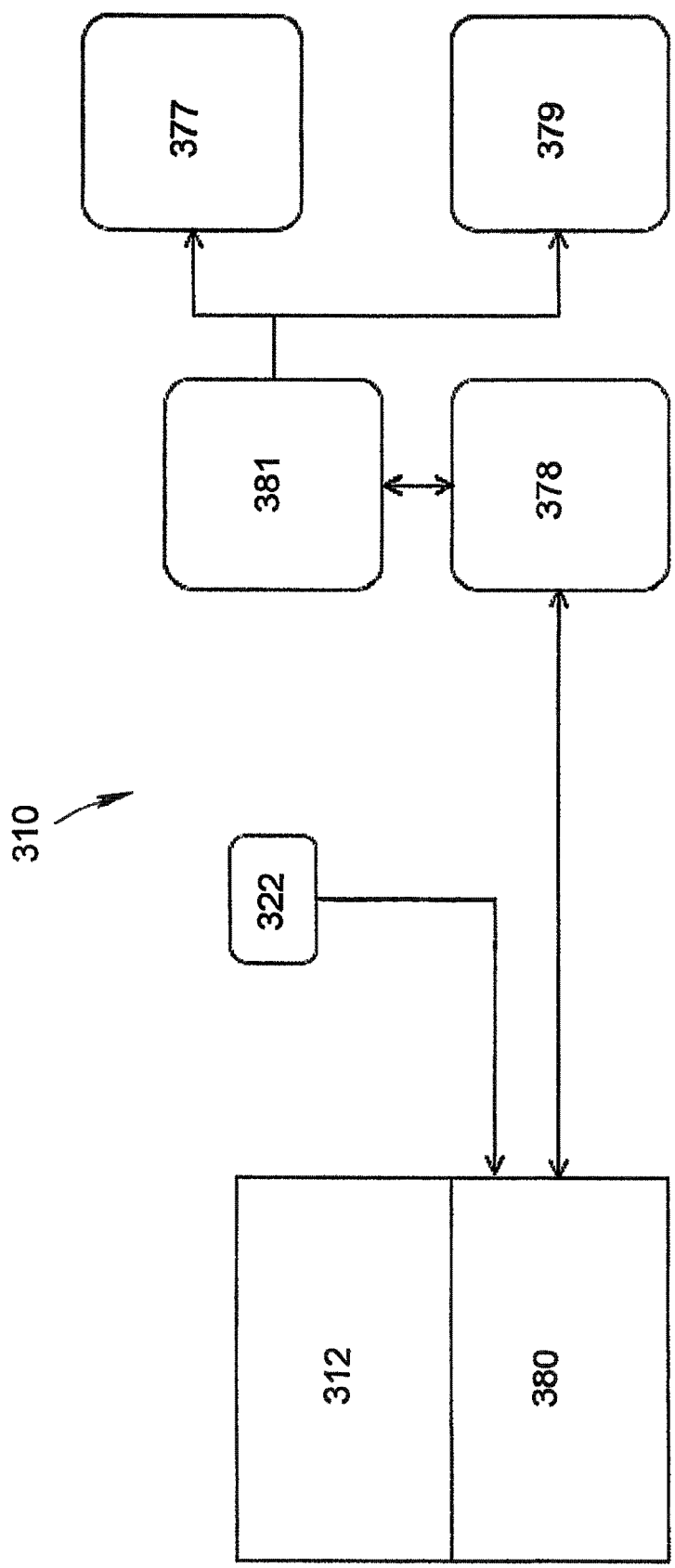
FIG. 3 is a schematic of an apparatus and system according to a third embodiment of the invention.
Figure 4:
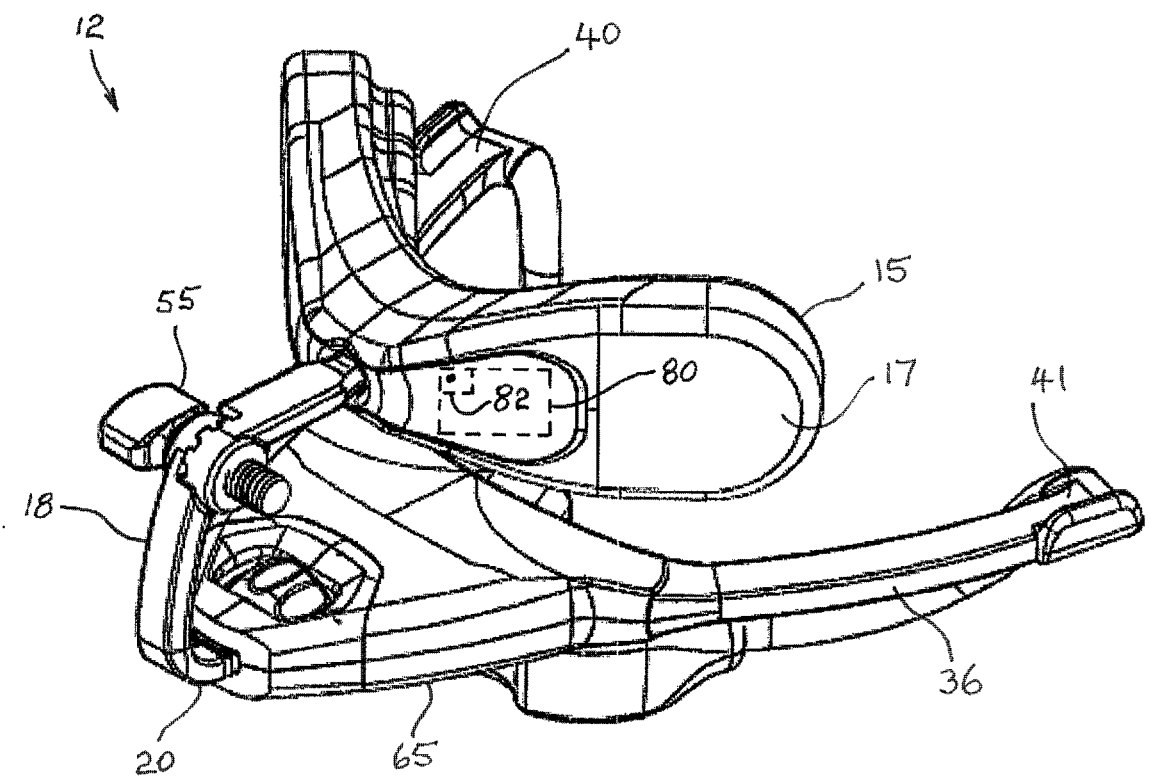
FIG. 4 is a perspective view of a mandibular advancement device forming part of the apparatus in FIG. 1.
Figure 5:
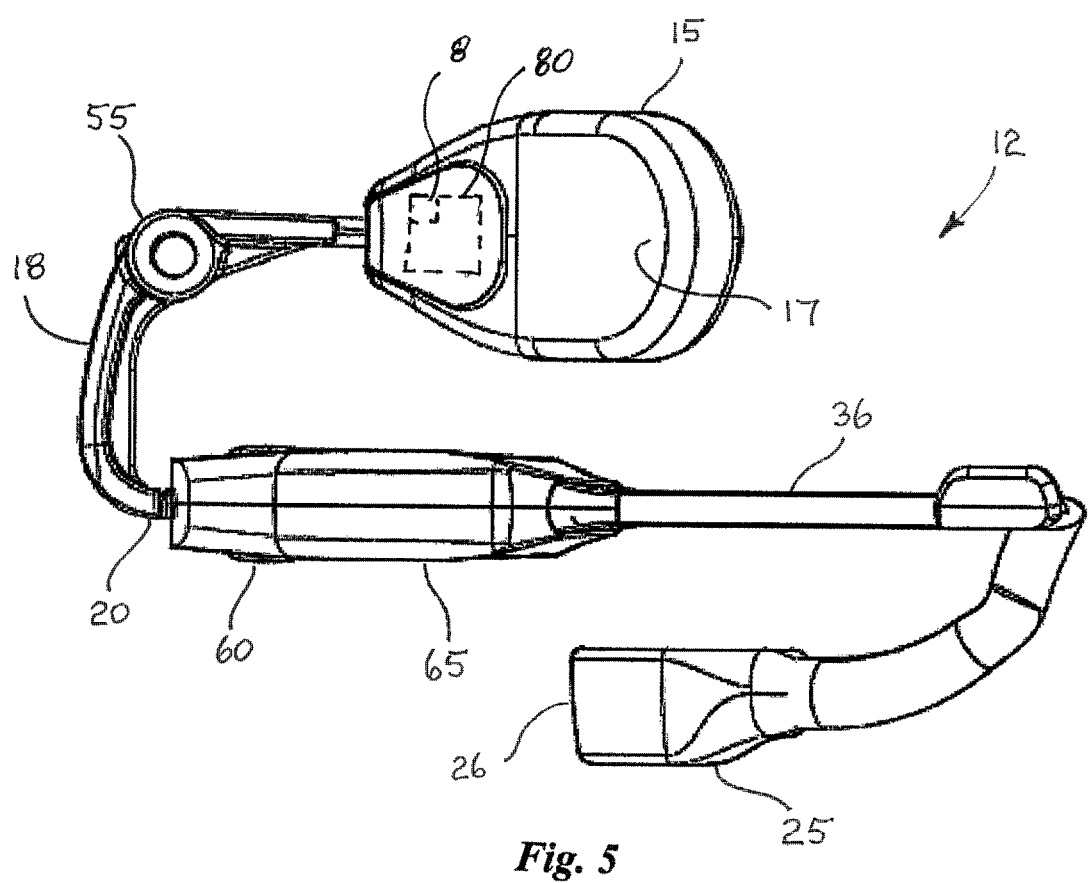
FIG. 5 is a side view of the device in FIG. 4.
Figure 6:
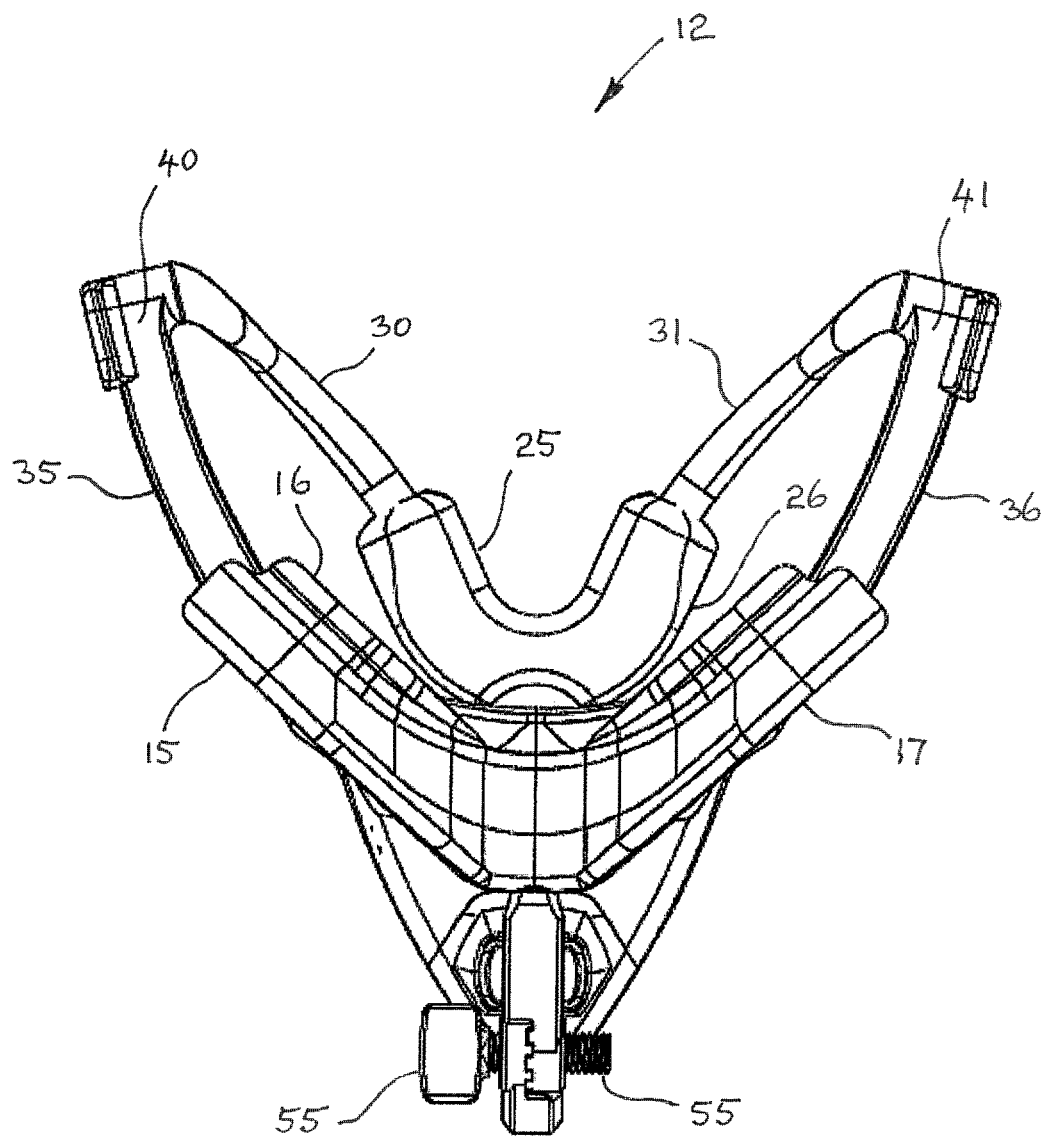
FIG. 6 is a plan view of the device in FIG. 4.
Figure 7:
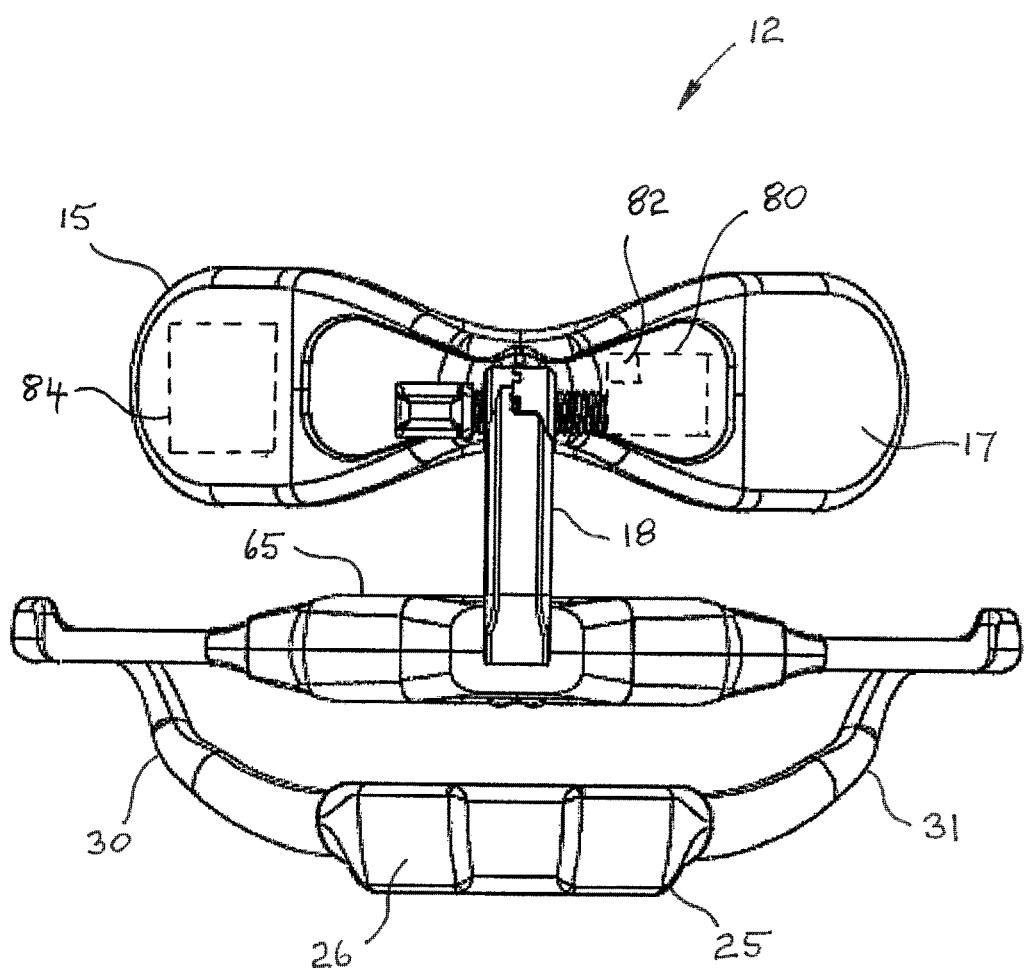
FIG. 7 is a frontal view of the device in FIG. 4.

The apparatus 310 in the system illustrated by FIG. 3 also provides for a local data collection on the user's home computer 377 as well as uploading to a global data collection database 379. The apparatus 310 also differs from the apparatus 210 (in FIG. 2) in that the base unit 214 is not used. Instead the SDCA module 380 is charged directly from the charger 322.

Figure 8:
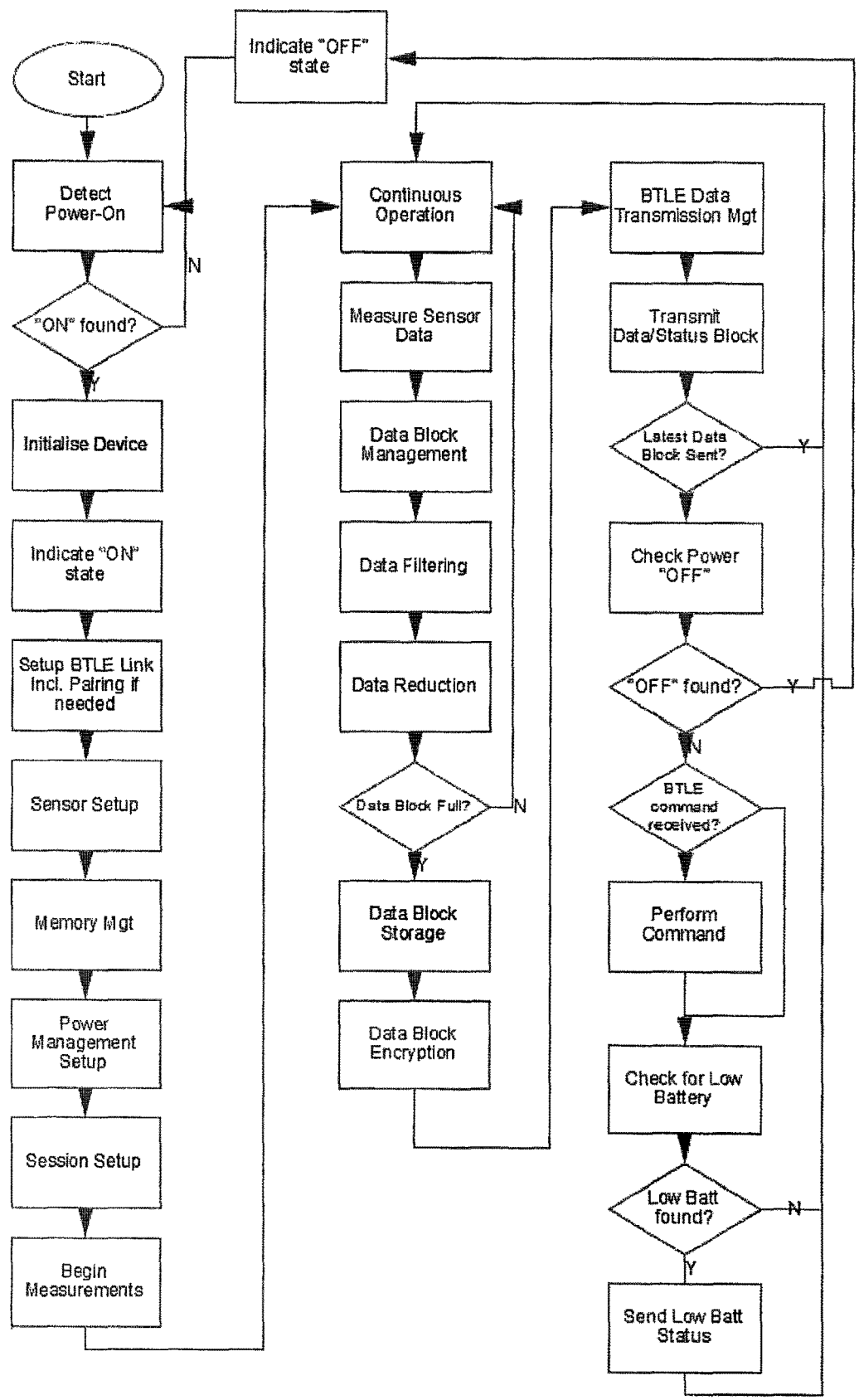
FIG. 8 is a flowchart showing the operation of the software in an SCDA module in the system illustrated in FIG. 3.
Figure 9:
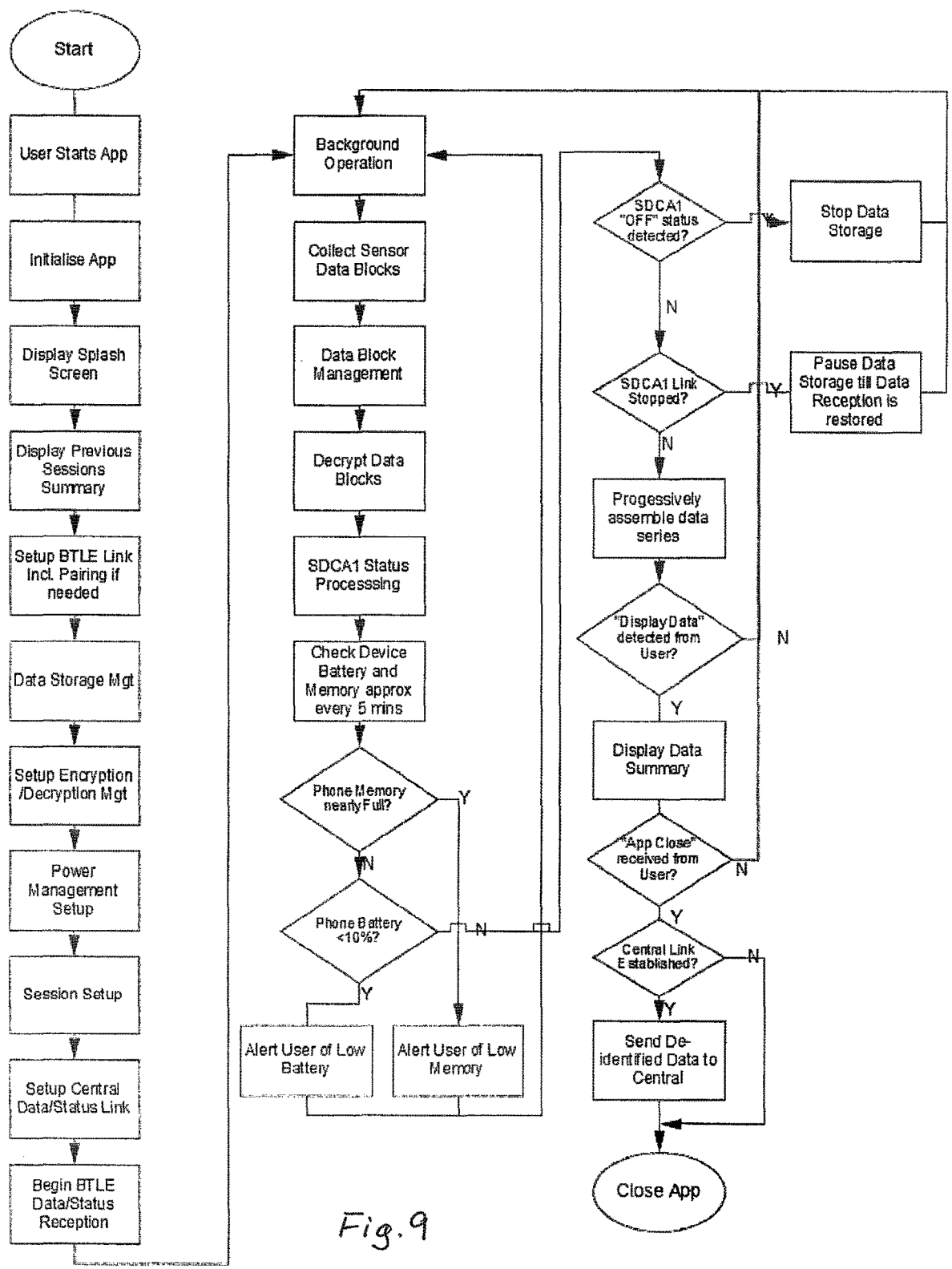
FIG. 9 is a flowchart showing the operation of the software in a smartphone in the system illustrated in FIG. 3.
Figure 10:
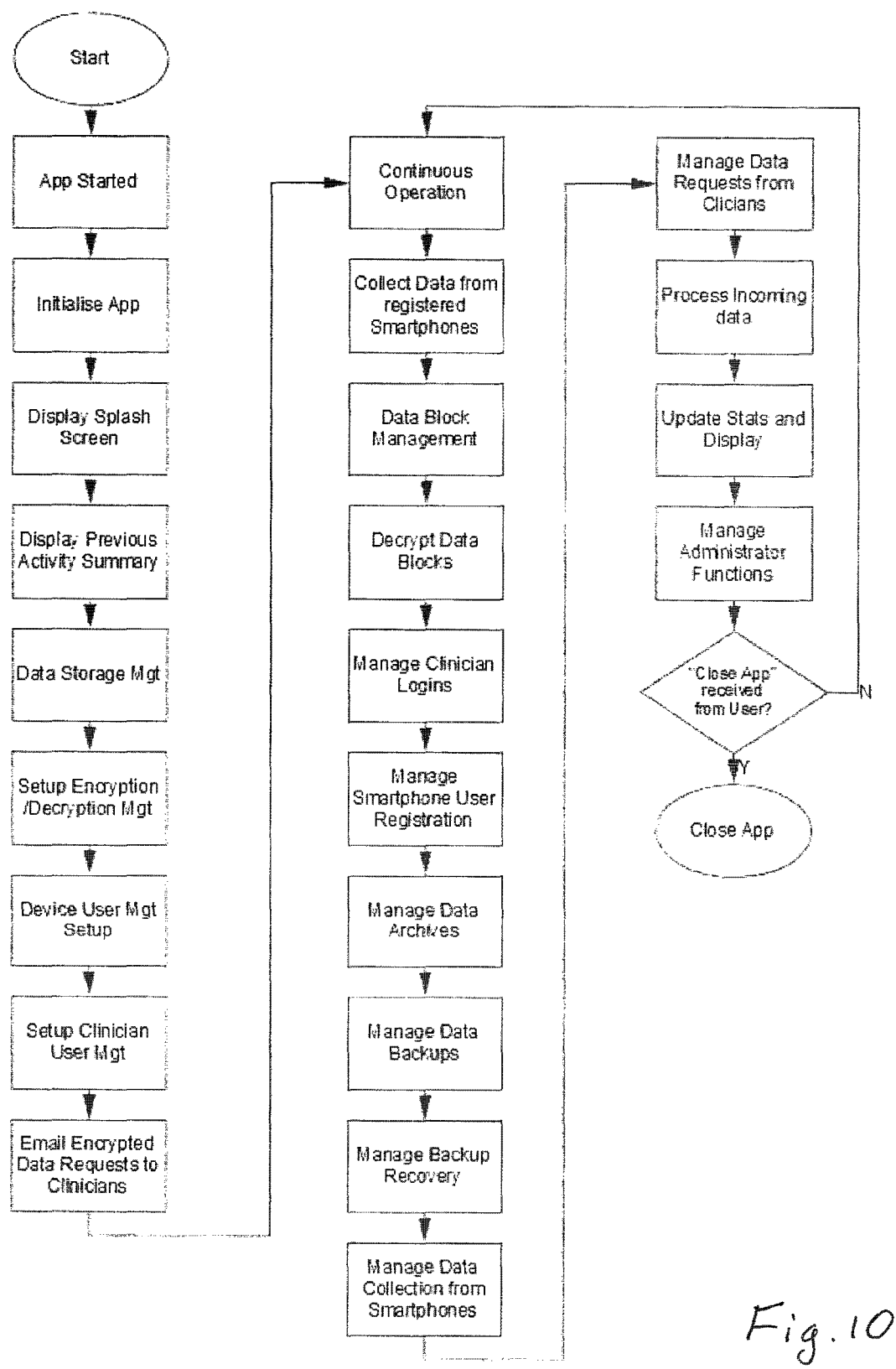
FIG. 10 is a flowchart showing the operation of the software in a central data collection computer facility in the system illustrated in FIG. 3.

In relation to the operations indicated by, and generally self-explanatory from, the flowcharts in FIGS. 8 to 10, the following additional features are noted.

All the data generated by the SDCA module 80 is stored in the module until it is able to be uploaded to the next component in the data collection/transmission chain.

If the memory of the SDCA module 80, base module or smartphone are at capacity, the oldest data is discarded in favour of any new uploads of sleep data.

The smartphone stores at least ten overnight data sets before needing to upload the data to the external repository 179.

The smartphone stores all data sets uploaded from the SDCA until the smartphone memory is nearly exhausted.

The user may elect to delete any or all data sets from the smartphone.

The user is able to peruse a list of data sets and determine which they may wish to delete.

The system utilizes data encryption between the SDCA module, the base unit and any attached smartphones.

The system allows a clinician to log in remotely and view the the sleep behavior of a patient in near real time.

Alternative embodiments of the invention do not utilize a mandibular advancement device in order to retain the SDCA module and its battery power supply. Instead a component similar to the curved anterior maxillary abutment provides a housing and may be held beneath the user's nose by adhesive tape or by an elastic strap around the user's head. This could be used for sleep analysis of people who do not suffer from OSA and those who would be unacceptably disturbed by sleeping while a foreign object is in their mouth.

Whilst the above description includes the preferred embodiments of the invention, it is to be understood that many variations, alterations, modifications and/or additions may be introduced into the constructions and arrangements of parts previously described without departing from the essential features or the spirit or ambit of the invention.

For example, the smartphone could be replaced by an alternative data processing means which has a suitable wireless data input such as Bluetooth LE. Its data output means (if present) may be wired or wireless.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge.

The invention claimed is:

1. A method of monitoring a status of a body of a person during sleep, said method comprising:
    retaining within a mouth of said body an intraoral body portion of a mandibular advancement device, the mandibular advancement device further comprising an extraoral anterior maxillary abutment portion mounted to the intraoral body portion via an extraoral member portion and an electronic detector being carried by the extraoral anterior maxillary abutment portion at a region directly below a nose of said body when the intraoral body portion is retained within said mouth, the extraoral member portion comprising:
        a first arm portion extending from a central bore within the intraoral body portion, the first arm portion being threadedly engaged with a wheel positioned in the central bore such that adjustment of the wheel is configured to facilitate adjustment of an effective length of extension of the first arm portion external to the intraoral body portion, and
        a second arm portion upon which the extraoral anterior maxillary abutment portion is mounted, the second arm coupled to the first arm portion via an extraoral adjustment means configured to angularly adjust the extraoral anterior maxillary abutment portion by adjusting an angle between the first arm portion and the second arm portion,
    detecting indications of a state of said body via the electronic detector, said indications including at least an airflow into and/or out of said nose,
    wirelessly transmitting a first data stream representing said indications to a data receiving means,
    transmitting said first data stream from said data receiving means to a data processing means,
    processing said first data stream within said data processing means to produce a second data stream representing said indications, or conclusion drawn from said indications, and
    displaying a visual representation of said indications or conclusions.

2. The method according to claim 1 comprising wirelessly transmitting said second data stream from said data processing means to a remote location.

3. The method according to claim 2 wherein for said person a single smartphone comprises:
    said data receiving means,
    said data processing means, and
    a means by which wirelessly transmitting the second data stream is made to said remote location.

4. The method according to claim 3 wherein said visual representation of said indications or conclusions is displayed on said smartphone.

5. The method according to claim 2 wherein said remote location comprises a computer facility which analyzes corresponding said second data stream received from multiple smartphones.

6. The method according to claim 1 wherein wirelessly transmitting said first data stream occurs while said person is asleep and said data receiving means is adjacent to said person.

7. The method according to claim 1 wherein said electronic detector is retained in position by the mandibular advancement device bearing on teeth and/or gingiva of said person.

8. The method according to claim 7 wherein said electronic detector is retained by or within the mandibular advancement device.

9. The method according to claim 1 wherein said electronic detector is mounted in a housing which is retained in position by adhesion or adhesive tape onto a face of the person.

10. The method according to claim 1 wherein said electronic detector is mounted in a housing which is retained in position by a strap extending around a head of said person.

11. A mandibular advancement device adapted to be worn by a person during sleep for monitoring a status of a body of said person during sleep, said device comprising:
   an intraoral body portion adapted to be retained within a mouth of said body,
   an extraoral anterior maxillary abutment portion mounted to the intraoral body portion via an extraoral member portion, the extraoral member portion comprising:
      a first arm portion extending from a central bore within the intraoral body portion, the first arm portion being threadedly engaged with a wheel positioned in the central bore such that adjustment of the wheel is configured to facilitate adjustment of an effective length of extension of the first arm portion external to the intraoral body portion, and
      a second arm portion upon which the extraoral anterior maxillary abutment portion is mounted, the second arm coupled to the first arm portion via an extraoral adjustment means configured to angularly adjust the extraoral anterior maxillary abutment portion by adjusting an angle between the first arm portion and the second arm portion,
   an electronic detector being carried by the extraoral anterior maxillary abutment portion at a region directly below a nose of said body when the intraoral body portion is retained within said mouth and configured to detect, from outside said body, indications of the status of said body, said indications including at least an airflow into and/or out of said nose, and
   means for wirelessly transmitting a first data stream representing said detected indications to a data receiving means located adjacent said sleeping person.

12. The device according to claim 11 wherein said indications of the status of said body further comprises airflow into and/or out of said mouth, audio and/or acceleration.

13. The device according to claim 12 wherein said indications of the status of said body further comprises one or more of electromusculogram data, electrooculogram data, electroencephalogram data, or percent of saturated oxygen.

14. An apparatus for monitoring the status of a body of a person during sleep, said apparatus comprising:
   a mandibular advancement device according to claim 11, and
   a mobile smartphone including:
      said data receiving means,
      a data processing means for receiving said first data stream from said data receiving means, processing said first data stream to produce a second data stream representing said status, or an indication of said status, data, or conclusions drawn from said indications, and
      means for transmitting from said data processing means to a remote location said second data stream representing said indications and/or an interpretation of, or conclusion drawn from, said indications.

15. The apparatus according to claim 14 wherein said data processing means comprises software loaded into said smartphone.

16. A method of monitoring a status of a body of a person during sleep, said method comprising:
   retaining within a mouth of said body an intraoral body portion of a mandibular advancement device, the device further comprising an extraoral anterior maxillary abutment portion mounted to the intraoral body portion via an extraoral member portion and an electronic detector positioned at a region directly below a nose of said body via the extraoral anterior maxillary abutment portion when the intraoral body portion is retained within said mouth, the extraoral member portion comprising:
      a first arm portion extending from a central bore within the intraoral body portion, the first arm portion being threadedly engaged with a wheel positioned in the central bore such that adjustment of the wheel is configured to facilitate adjustment of an effective length of extension of the first arm portion from external to the intraoral body portion, and
      a second arm portion upon which the extraoral anterior maxillary abutment portion is mounted, the second arm coupled to the first arm portion via an extraoral adjustment means configured to angularly adjust the extraoral anterior maxillary abutment portion by adjusting an angle between the first arm portion and the second arm portion,
   detecting indications of a state of said body via the electronic detector, said indications including at least an airflow into and/or out of said nose,
   wirelessly transmitting a first data stream representing said indications to a data receiving means,
   transmitting said first data stream from said data receiving means to a data processing means,
   processing said first data stream within said data processing means to produce a second data stream representing said indications, or conclusion drawn from said indications, and
   displaying a visual representation of said indications or conclusions.

17. The method according to claim 16 wherein said electronic detector is retained in position by the mandibular advancement device bearing on teeth and/or gingiva of said person.

18. The method according to claim 16 wherein said electronic detector is retained by or within the mandibular advancement device.

* * * * *